(12) United States Patent
Bhattacharya et al.

(10) Patent No.: US 11,763,817 B2
(45) Date of Patent: *Sep. 19, 2023

(54) METHODS, SYSTEMS, AND MEDIA FOR CONNECTING AN IOT DEVICE TO A CALL

(71) Applicant: Google LLC, Mountain View, CA (US)

(72) Inventors: Saptarshi Bhattacharya, Seattle, WA (US); Shreedhar Madhavapeddi, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,449

(22) Filed: Apr. 25, 2022

(65) Prior Publication Data

US 2022/0246151 A1 Aug. 4, 2022

Related U.S. Application Data

(63) Continuation of application No. 15/922,602, filed on Mar. 15, 2018, now Pat. No. 11,315,554.
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *H04L 12/1813* (2013.01);
(Continued)

(58) Field of Classification Search
CPC ..... G10L 15/22; G10L 2015/223; G06F 3/167; H04L 12/1813; H04L 51/18;
(Continued)

(56) References Cited

U.S. PATENT DOCUMENTS 6,363,349 B1 3/2002 Urs et al.
6,650,748 B1 11/2003 Edwards et al.
(Continued)

FOREIGN PATENT DOCUMENTS

WO WO 2001027895 4/2001

OTHER PUBLICATIONS

3GPP, "Technical Specification Group Core Network and Terminals; Communication Diversion (CDIV) using IP Multimedia (IM) Core Newtowrk (CN) Subsystem; Protocol Specification (Release 14)", Technical Paper, Mar. 17, 2017, pp. 1-59.
(Continued)

*Primary Examiner* — Michael N Opsasnick
(74) *Attorney, Agent, or Firm* — Kilpatrick Townsend & Stockton LLP (57) ABSTRACT

Methods, systems, and media for connecting an IoT device to a call are provided. In some embodiments, a method is provided, the method comprising: establishing, at a first end-point device, a telecommunication channel with a second end-point device; subsequent to establishing the telecommunication channel, and prior to a termination of the telecommunication channel, detecting, using the first end-point device, a voice command that includes a keyword; and in response to detecting the voice command, causing information associated with an IoT device that corresponds to the keyword to be transmitted to the second end-point device.

21 Claims, 5 Drawing Sheets

Related U.S. Application Data (60) Provisional application No. 62/527,830, filed on Jun. 30, 2017.

(51) Int. Cl.
*H04W 4/70* (2018.01)
*H04W 76/10* (2018.01)
*H04L 67/125* (2022.01)
*H04L 65/403* (2022.01)
*H04L 65/1093* (2022.01)
*H04L 65/401* (2022.01)
*H04L 12/18* (2006.01)
*H04L 51/18* (2022.01)

(52) U.S. Cl.
CPC .......... *H04L 51/18* (2013.01); *H04L 65/1093* (2013.01); *H04L 65/403* (2013.01); *H04L 65/4015* (2013.01); *H04L 67/125* (2013.01); *H04W 4/70* (2018.02); *H04W 76/10* (2018.02); *G10L 2015/223* (2013.01)

(58) Field of Classification Search
CPC ............. H04L 65/1093; H04L 65/4015; H04L 65/403; H04L 67/125; H04W 4/70; H04W 76/10
See application file for complete search history.

(56) References Cited

U.S. PATENT DOCUMENTS

| | | |
|---|---|---|
| 7,466,977 B2 | 12/2008 | Levien et al. |
| 7,587,032 B1 | 9/2009 | de Waal |
| 8,340,631 B2 | 12/2012 | Mann et al. |
| 9,037,455 B1 | 5/2015 | Faaborg et al. |
| 9,065,786 B2 | 6/2015 | Plotkin et al. |
| 9,424,840 B1 | 8/2016 | Hart et al. |
| 9,570,075 B1 | 2/2017 | Kashimba et al. |
| 9,571,532 B1 | 2/2017 | Kashimba et al. |
| 10,026,394 B1 | 7/2018 | Carbon et al. |
| 11,315,554 B2* | 4/2022 | Bhattacharya ...... H04L 65/1093 |
| 11,589,100 B1* | 2/2023 | Vegas ..................... H04L 9/083 |
| 2002/0055973 A1 | 5/2002 | Low et al. |
| 2004/0019489 A1 | 1/2004 | Funk et al. |
| 2004/0266416 A1 | 12/2004 | Matsumoto |
| 2005/0265318 A1 | 12/2005 | Khartabil et al. |
| 2006/0114852 A1 | 6/2006 | Levien et al. |
| 2008/0248797 A1 | 10/2008 | Freeman et al. |
| 2009/0093240 A1 | 4/2009 | Lang |
| 2010/0227631 A1 | 9/2010 | Bolton et al. |
| 2011/0022885 A1 | 1/2011 | Holappa et al. |
| 2011/0063506 A1 | 3/2011 | Reams |
| 2012/0159353 A1 | 6/2012 | Beerse et al. |
| 2013/0053152 A1 | 2/2013 | Tabata |
| 2013/0281054 A1 | 10/2013 | Ye et al. |
| 2013/0321340 A1 | 12/2013 | Seo et al. |
| 2014/0108943 A1 | 4/2014 | Lee et al. |
| 2014/0136195 A1 | 5/2014 | Abdossalami et al. |
| 2014/0207468 A1 | 7/2014 | Bartnik |
| 2014/0233559 A1 | 8/2014 | Zhong et al. |
| 2014/0278438 A1 | 9/2014 | Hart et al. |
| 2014/0331144 A1 | 11/2014 | Kim et al. |
| 2014/0362982 A1 | 12/2014 | Han et al. |
| 2015/0201022 A1 | 7/2015 | Kim et al. |
| 2015/0229677 A1 | 8/2015 | Gu et al. |
| 2015/0237144 A1 | 8/2015 | Miao et al. |
| 2015/0350421 A1 | 12/2015 | Lau et al. |
| 2016/0019896 A1 | 1/2016 | Alvarez Guevara et al. |
| 2016/0065711 A1 | 3/2016 | De Carney |
| 2016/0105292 A1 | 4/2016 | Choi et al. |
| 2016/0150089 A1 | 5/2016 | Garg |
| 2016/0261648 A1 | 9/2016 | Ruetschi et al. |
| 2016/0285979 A1 | 9/2016 | Wang et al. |
| 2016/0314792 A1 | 10/2016 | Alvarez Guevara et al. |
| 2016/0349722 A1 | 12/2016 | On et al. |
| 2016/0364223 A1 | 12/2016 | Vandikas et al. |
| 2017/0034042 A1* | 2/2017 | Gross ................ H02J 13/00007 |
| 2017/0134553 A1 | 5/2017 | Jeon et al. |
| 2017/0221487 A1 | 8/2017 | Faaborg et al. |
| 2017/0237815 A1* | 8/2017 | Arsenault ............... H04W 4/70 709/217 |
| 2017/0270916 A1 | 9/2017 | Prokhorov |
| 2017/0279963 A1 | 9/2017 | Mittal |
| 2018/0061419 A1* | 3/2018 | Melendo Casado .... G10L 25/78 |
| 2018/0109681 A1 | 4/2018 | McLean et al. |
| 2018/0132076 A1 | 5/2018 | Chen et al. |
| 2018/0139253 A1 | 5/2018 | Ruetschi et al. |
| 2018/0174434 A1* | 6/2018 | Dyer ...................... G08C 17/02 |
| 2018/0197550 A1 | 7/2018 | Wang et al. |
| 2018/0220472 A1 | 8/2018 | Schopp et al. |
| 2019/0005956 A1* | 1/2019 | Bhattacharya .......... H04W 4/70 |
| 2019/0245680 A1* | 8/2019 | Boutaba .................. H04L 9/006 |

OTHER PUBLICATIONS

3GPP, "Technical Specification Group Services and System Aspects; IP Multimedia Subsystem (IMS) Service Continuity; State 2 (Release 14)", Technical Paper, Dec. 16, 2016, pp. 1-180.
Examination Report dated Apr. 30, 2021 in EP Patent Application No. 18718958.4.
International Search Report and Written Opinion dated Jun. 7, 2018 in International Patent Application No. PCT/US2018/022381.
International Search Report and Written Opinion dated Jun. 7, 2018 in International Patent Application No. PCT/US2018/022697.
Notice of Allowance dated Oct. 19, 2021 in U.S. Appl. No. 15/921,178.
Notice of Allowance dated Dec. 23, 2021 in U.S. Appl. No. 15/922,602.
Office Action dated Jan. 9, 2020 in U.S. Appl. No. 15/921,178.
Office Action dated Feb. 12, 2020 in U.S. Appl. No. 15/922,602.
Office Action dated Mar. 11, 2021 in U.S. Appl. No. 15/922,602.
Office Action dated Apr. 27, 2021 in U.S. Appl. No. 15/921,178.
Office Action dated May 26, 2020 in U.S. Appl. No. 15/922,602.
Office Action dated Jun. 22, 2020 in U.S. Appl. No. 15/921,178.
Office Action dated Jun. 27, 2019 in U.S. Appl. No. 15/921,178.
Office Action dated Jul. 6, 2021 in U.S. Appl. No. 15/922,602.
Office Action dated Sep. 14, 2020 in U.S. Appl. No. 15/922,602.
Office Action dated Nov. 23, 2020 in U.S. Appl. No. 15/921,178.

* cited by examiner

METHODS, SYSTEMS, AND MEDIA FOR CONNECTING AN IOT DEVICE TO A CALL

CROSS-REFERENCE TO RELATED APPLICATIONS

This application is a continuation of U.S. patent application Ser. No. 15/922,602, filed Mar. 15, 2018, now U.S. Pat. No. 11,315,554, granted Apr. 26, 2022, which claims the benefit of U.S. Provisional Application No. 62/527,830, filed Jun. 30, 2017, each of which is hereby incorporated by reference herein in its entirety.

TECHNICAL FIELD

The disclosed subject matter relates to methods, systems, and media for connecting an Internet of things (IoT) device to a call.

BACKGROUND

IoT devices such as thermostats, light fixtures, cameras, speakers, and personal assistants are increasingly popular. Occasionally, a person may be engaged in a call and wish to provide another person in the call access to an IoT device, or information about an IoT device. However, no known mechanisms provide such access or information to the other person.

Accordingly, it is desirable to provide new methods, systems, and media for connecting an IoT device to a call.

SUMMARY

In accordance with some embodiments of the disclosed subject matter, mechanisms for connecting an IoT device to a call are provided.

In accordance with some embodiments of the disclosed subject matter, a method is provided, the method comprising: establishing, at a first end-point device, a telecommunication channel with a second end-point device; subsequent to establishing the telecommunication channel, and prior to a termination of the telecommunication channel, detecting, using the first end-point device, a voice command that includes a keyword; and in response to detecting the voice command, causing information associated with an IoT device that corresponds to the keyword to be transmitted to the second end-point device.

In some embodiments, the method further comprises determining that the IoT device is available for wireless communication; receiving an indication of the keyword; and determining that the keyword is to be associated with the IoT device based on the indication of the keyword.

In some embodiments, the indication of the keyword is based on a user input.

In some embodiments, the indication of the keyword is received from a server device that is associated with a user account with which the IoT device is associated.

In some embodiments, the method further comprises determining that the first end-point device and the IoT device are connected to a particular local area network.

In some embodiments, the method further comprises causing the IoT device to join the telecommunication channel, wherein the information associated with the IoT device is transmitted by the IoT device to the second end-point device using the telecommunication channel.

In some embodiments, the second end-point device is associated with a user account, and wherein the information associated with the IoT device is transmitted to the user account.

In some embodiments, the information associated with the IoT device comprises status information related to a status of the IoT device.

In some embodiments, the information associated with the IoT device comprises information that can be used to initiate a connection with the IoT device, and the method further comprises: causing, using a connection initiated by the second end-point device, status information related to a status of the IoT device to be transmitted by the IoT device to the second end-point device.

In accordance with some embodiments of the disclosed subject matter, a system is provided, the system comprising a hardware processor that is configured to: establish, at a first end-point device, a telecommunication channel with a second end-point device; subsequent to establishing the telecommunication channel, and prior to a termination of the telecommunication channel, detect, using the first end-point device, a voice command that includes a keyword; and in response to detecting the voice command, cause information associated with an IoT device that corresponds to the keyword to be transmitted to the second end-point device.

In accordance with some embodiments of the disclosed subject matter, a non-transitory computer-readable medium is provided, the non-transitory computer-readable medium containing computer-executable instructions that, when executed by a processor, cause the processor to perform a method comprising: establishing, at a first end-point device, a telecommunication channel with a second end-point device; subsequent to establishing the telecommunication channel, and prior to a termination of the telecommunication channel, detecting, using the first end-point device, a voice command that includes a keyword; and in response to detecting the voice command, causing information associated with an IoT device that corresponds to the keyword to be transmitted to the second end-point device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments of the disclosed subject matter, mechanisms (which can include methods, systems, and media) for connecting an IoT device to a call are provided.

In some embodiments of the disclosed subject matter, the mechanisms described herein can connect a device to a call with a third party, and in response to detecting certain voice commands, can cause an IoT device to be added to the call, and/or can cause information about the IoT device to be transmitted to a third party. For example, the mechanisms can connect a mobile device to a call, and during the call, detect a user voice command that is associated with adding a particular IoT device, such as a refrigerator, to the call. To continue the example, in some embodiments, the mechanisms can then use stored connection information associated with the IoT device (e.g., an I.P. address, or a BLUETOOTH address) to initiate a connection with the IoT device, and cause the IoT device to join the call. After joining the call, the IoT device can then transmit information about the IoT device (e.g., a status of the device, an error code, etc.) to the third party.

In some embodiments, the mechanisms can provide a user with the opportunity to configure and/or customize voice commands and the operations with which the voice commands are associated. For example, the mechanisms can allow a user to select which operations, and/or which devices, are to be associated with which voice commands. As a more particular example, the mechanisms can allow a user to configure one voice command for adding a television to a call, configure another voice command for adding a laptop computer to a call, and yet another voice command for causing the laptop computer to transmit device information associated with the laptop computer to a third party. As another example, the mechanisms can allow a user to select keywords and/or key phrases that are to be recognized as voice commands. As a more particular example, the mechanisms can provide a user with an opportunity to speak keywords and/or key phrases that the user wishes to be recognized as a voice command, detect the keywords and/or key phrases being spoken, and then store information pertaining to the keywords and/or key phrases detected, in connection with an operation to be performed, as a voice command. To continue this example, at a later time, the mechanisms can then detect that the user has spoken keywords and/or key phrases using, for example, a speech detection technique, recognize that the keywords and/or key phrases correspond to a configured voice command, and cause the corresponding operation to be performed.

Figure 1:
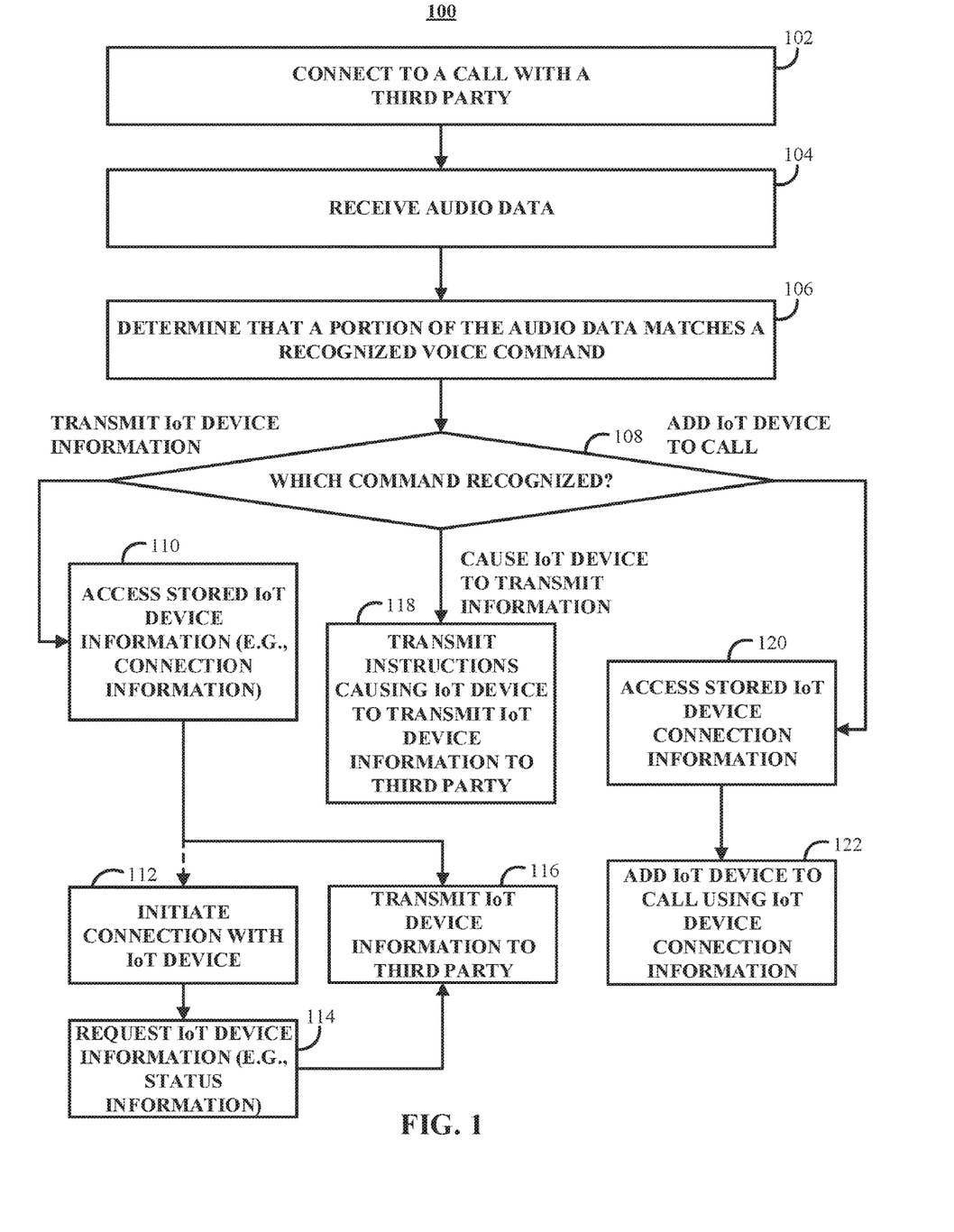
FIG. 1 shows a flow diagram of an example of a process for connecting an IoT device to a call in accordance with some embodiments of the disclosed subject matter.

FIG. 1 shows a flow diagram of an example 100 of a process for connecting an IoT device to a call in accordance with some embodiments of the disclosed subject matter.

At 102, process 100 can connect to a call with a third party.

In some embodiments, at 102, process 100 can connect any suitable device to a call, such as an end-point device 410, as described below in connection with FIG. 4.

In some embodiments, at 102, process 100 can connect to any suitable type of call. For example, process 100 can connect to a telephone call, a VoIP ("Voice over Internet Protocol") call, a video call, an audio tele-conference call, or any other suitable type of call.

At 104, process 100 can receive audio data.

In some embodiments, at 104, process 100 can receive audio data by causing a microphone to be activated, and receiving the audio data via the microphone. Any suitable microphone can be used in some embodiments. For example, process 100 can use a microphone of an end-point device, a microphone of headphones connected to an end-point device, a microphone connected to an end-point device, a microphone of another device that is communicatively connected to an end-point device (e.g., using a wireless connection), or any other suitable microphone.

In some embodiments, at 104, process 100 can receive audio data by capturing audio data that is being transmitted over a call with a third party.

In some embodiments, at 104, process 100 can receive audio data via a transmission from an end-point device. For example, in a situation where process 100 is being executed at least in part using a server device (e.g., server device 402 as described below in connection with FIG. 4), an end-point device can transmit audio data to process 100 via an Internet connection.

In some embodiments, at 104, process 100 can receive audio data having any suitable format. For example, process 100 can receive: raw audio data (e.g., audio data that is in a pulse code modulation format); audio data in a compressed format (e.g., MPEG layer 3); audio data in a lossless compression format (e.g., Free Lossless Audio Codec); audio data in any other suitable format; and/or any suitable combination thereof.

At 106, process 100 can determine that received audio data includes a recognized voice command.

In some embodiments, process 100 can use any suitable speech recognition technique to determine that received audio data contains a recognized command. For example, process 100 can use acoustic modeling, language modeling, Hidden Markov Models, dynamic time warping algorithms, neural networks, deep neural networks, end-to-end automatic speech recognition, any other suitable speech recognition technique, or any suitable combination thereof to determine that audio data contains a recognized command.

In some embodiments, at 106, process 100 can determine that received audio data contains a recognized command by identifying a keyword, keywords, or key phrases that are associated with the recognized command. For example, a recognized command for adding a device to a call can be associated with a single keyword, such as "add," several keywords, such as "group," "conference," and "connect," or a key phrase such as "connect my tablet." In a situation in which the recognized command is associated with several keywords, process 100 can require that all of the associated keywords, or that only a portion of the associated keywords, be identified in the audio data in order to recognize the command.

In some embodiments, certain keywords associated with a recognized voice command can correspond to operations to be performed, while other keywords can correspond to IoT devices. For example, a keyword such as "transmit" can correspond to an operation for transmitting information from an IoT device to a third party. As another example, a keyword such as "tablet" can correspond to a tablet device. As a more particular example, in a situation in which process 100 receives audio data that is recognized to contain both the keyword "transmit" and the keyword "tablet," process 100 can determine that the audio data includes a recognized voice command for transmitting information from the tablet device.

In some embodiments, in addition to determining that audio data contains keywords and/or key phrases corresponding to a recognized voice command, at 106, process 100 can determine that received audio data includes a recognized voice (e.g., based on stored voice information, as discussed below in connection with FIG. 2) using any suitable voice recognition, speaker identification, or speaker verification technique. For example, process 100 can use frequency estimation, Hidden Markov Models, Gaussian mixture models, pattern matching algorithms, neural networks, matrix representation, vector quantization, template matching, text-dependent techniques, text-independent techniques, any other suitable technique, or any suitable combination thereof to determine that received audio data includes a recognized voice.

In some embodiments, a recognized voice command can correspond to a user-defined voice command. For example, in some embodiments, user-defined voice commands can be configured and stored using process 200 as described below in connection with FIG. 2.

Additionally or alternatively, in some embodiments, a recognized voice command can correspond to a voice command that is not user-defined. For example, a recognized voice command can correspond to a voice command that is based on a set of keywords and/or key phrases that are programmatically defined.

In some embodiments, in addition or in alternative to recognizing a voice command that has already been configured and/or defined, at 106, process 100 can use any suitable artificial intelligence mechanism (e.g., a virtual assistant mechanism) to determine that received audio data includes an unconfigured voice command. For example, process 100 can use any suitable artificial intelligence mechanism to determine that a portion of received speech is a voice command, and determine an operation to be performed based on the voice command. As a more particular example, process 100 can determine that a user has spoken a phrase such as "add my refrigerator to the call," and use artificial intelligence to determine that this phrase corresponds to a voice command for adding a refrigerator associated with the user to a call that the user is engaged in.

At 108, process 100 can determine which voice command was recognized at 106.

In some embodiments, if process 100 determines at 108 that a voice command for transmitting IoT device information was recognized, then process 100 can access stored IoT device information at 110.

In some embodiments, IoT device information can include any suitable information. For example, IoT device information can include information that can be used to initiate a connection with an IoT device, such as a phone number, an I.P. address, wireless connection configuration information (e.g., a BLUETOOTH address, a MAC address, and/or an I.P. address), authentication information associated with an IoT device (e.g., a user name and/or password), and/or any other suitable information that can be used to initiate a connection. As another example, IoT device information can include any suitable information logged by the device. As a more particular example, information logged by the device can include information related to usage of the device, times at which the device was accessed, information about operation performed by the device, temperatures recorded by the device, and/or any other suitable information logged by the device.

In some embodiments, IoT device information can include status information associated with an IoT device. Status information can be related to any suitable status of an IoT device in some embodiments. For example, status information can be related to a connectivity status of an IoT device (e.g., status information identifying a network that the IoT device is connected to, or status information indicating that the IoT device is not connected to a network). As another example, status information can be related to an error status of an IoT device (e.g., information indicating that the IoT device has encountered an error, and/or information identifying a particular error that the IoT device has encountered).

In some embodiments, stored IoT device information can be stored at any suitable location. For example, IoT device information can be stored on an end-point device, on an IoT device, and/or on a server device.

In some embodiments in which IoT device information is stored at a device that is separate from a device that is executing at least a portion of process 100, IoT device information can be accessed by the device that is separate. For example, in a situation in which process 100 is being executed by an end-point device and IoT device information is stored at an IoT device, the IoT device can access stored IoT device information. In such an example, the IoT device can access the stored IoT device information in response to receiving a notification that a voice command has been recognized.

If process 100 accesses IoT device information that includes information that can be used to initiate a connection with an IoT device at 110, in some embodiments, process 100 can initiate a connection with an IoT device at 112. Additionally or alternatively, in some embodiments, process 100 can initiate a connection with an IoT device at 112 in response to process 100 accessing IoT device information at 110 that does not include status information associated with an IoT device.

In some embodiments, process 100 can initiate a connection with any suitable IoT device. For example, process 100 can initiate a connection with IoT device 416 as described below in connection with FIG. 4.

In some embodiments, process 100 can initiate a connection with an IoT device that is associated with a voice command that has been recognized at 106.

In some embodiments in which process 100 accesses stored IoT device information that includes information that can be used to initiate a connection with an IoT device, process 100 can initiate a connection with the IoT device, at 112, using the stored IoT device information.

In some embodiments, process 100 can initiate any suitable connection with an IoT device. For example, process 100 can initiate a near-field communication connection, a BLUETOOTH connection, a Wi-Fi connection, any other suitable connection, or any suitable combination thereof.

At 114, process 100 can request IoT device information.

In some embodiments, process 100 can request IoT device information from any suitable source. For example, process 100 can request IoT device information from an IoT device (e.g., an IoT device that is associated with a voice command that has been recognized at 106). As a more particular example, process 100 can utilize a connection with an IoT device that has been initiated at 112 to request IoT device information from the IoT device. As another example, process 100 can request IoT device information from a server device. As a more particular example, process 100 can request IoT device information from a server device that periodically requests and/or receives IoT device information from IoT devices.

At 116, process 100 can transmit IoT device information to a third party.

In some embodiments, process 100 can transmit IoT device information to any suitable third party. For example, process 100 can transmit IoT device information to a third party that is connected to the same call to which process 100 connected at 102. As a more particular example, process 100 can transmit IoT device information to a device of the third party that is connected to the call. As another more particular example, process 100 can transmit IoT device information to a user account or e-mail address associated with the third party. As a still more particular example, in a situation in which the call to which process 100 connected at 102 is a call hosted by a VoIP or video calling service, process 100 can transmit IoT device information to a user account of the VoIP or video calling service.

In some embodiments, process 100 can transmit IoT device information using any suitable technique or combination of techniques. For example, process 100 can transmit IoT device information via a message, such as an e-mail message, a text message, a Hypertext Transfer Protocol message, an online chat message, and/or any other suitable type of message. As another example, process 100 can transmit a link to a web page where the IoT device information is accessible.

In some embodiments, process 100 can transmit IoT device information in response to receiving IoT device information that was requested at 114.

In some embodiments, process 100 can transmit IoT device information configured to allow and/or cause a device of the third party to initiate a connection with an IoT device. For example, process 100 can transmit information that can be used to initiate a connection with an IoT device, and/or instructions configured to cause a device to initiate a connection using such information.

In some embodiments, process 100 can transmit IoT device information in response to receiving a request for IoT device information from a third party device that is connected to the same call to which process 100 connected at 102.

In some embodiments, if process 100 determines at 108 that a voice command for causing an IoT device to transmit information was recognized at 106, then process 100 can transmit instructions causing an IoT device to transmit information to a third party at 118.

In some embodiments, at 118, process 100 can transmit instructions that cause an IoT device to transmit IoT device information to any suitable third party (e.g., as described above in connection with 116).

In some embodiments, process 100 can transmit instructions containing any suitable information. For example, process 100 can transmit instructions containing information that can be used by an IoT device to initiate a connection with a third party device. In such an example, process 100 can transmit instructions that are configured to cause an IoT device to initiate a connection with a third party device using such information, and transmit IoT device information using the initiated connection. As a more particular example, process 100 can transmit an I.P. address associated with a device of the third party that is connected to the same call to which process 100 connected at 102. As another example, process 100 can transmit instructions containing contact information associated with a third party, such as an e-mail address and/or a phone number. In such an example, process 100 can transmit instructions that are configured to cause an IoT device to transmit an e-mail or text message, respectively, containing IoT device information.

In some embodiments, at 118, process 100 can initiate a connection with an IoT device (e.g., as described above in connection with 112), and use the initiated connection to transmit instructions to the IoT device.

In some embodiments, if process 100 determines at 108 that a voice command for adding an IoT device to a call was recognized at 106, then process 100 can access stored IoT device connection information at 120.

In some embodiments, IoT device connection information can be any suitable connection information. For example, IoT device connection information can be information usable to initiate a connection with an IoT device as described above in connection with 110.

In some embodiments, device connection information can be stored at any suitable location, such as at an end-point device (e.g., an end-point device connected to a call to which an IoT device is to be added), and/or at a server device (e.g., a server device hosting a call to which an IoT device is to be added and/or a server device executing process 100).

At 122, process 100 can add an IoT device to a call using IoT device connection information.

In some embodiments, process 100 can add an IoT device to the same call to which process 100 connected at 102. Additionally or alternatively, in some embodiments, process 100 can add an IoT device to a different call.

In some embodiments, process 100 can use any suitable technique or combination of techniques to add an IoT device to a call. For example, in a situation in which an IoT device is to be added to a telephone call, process 100 can use any suitable three-way calling and/or conference calling technique to add an IoT device to a call. As another example, in a situation in which an IoT device is to be added to a video call or a VoIP call, process 100 can transmit information and/or instructions to a device hosting the call that can be used by the hosting device to add the IoT device to the call (e.g., an I.P. address and/or MAC address associated with the IoT device).

Figure 2:
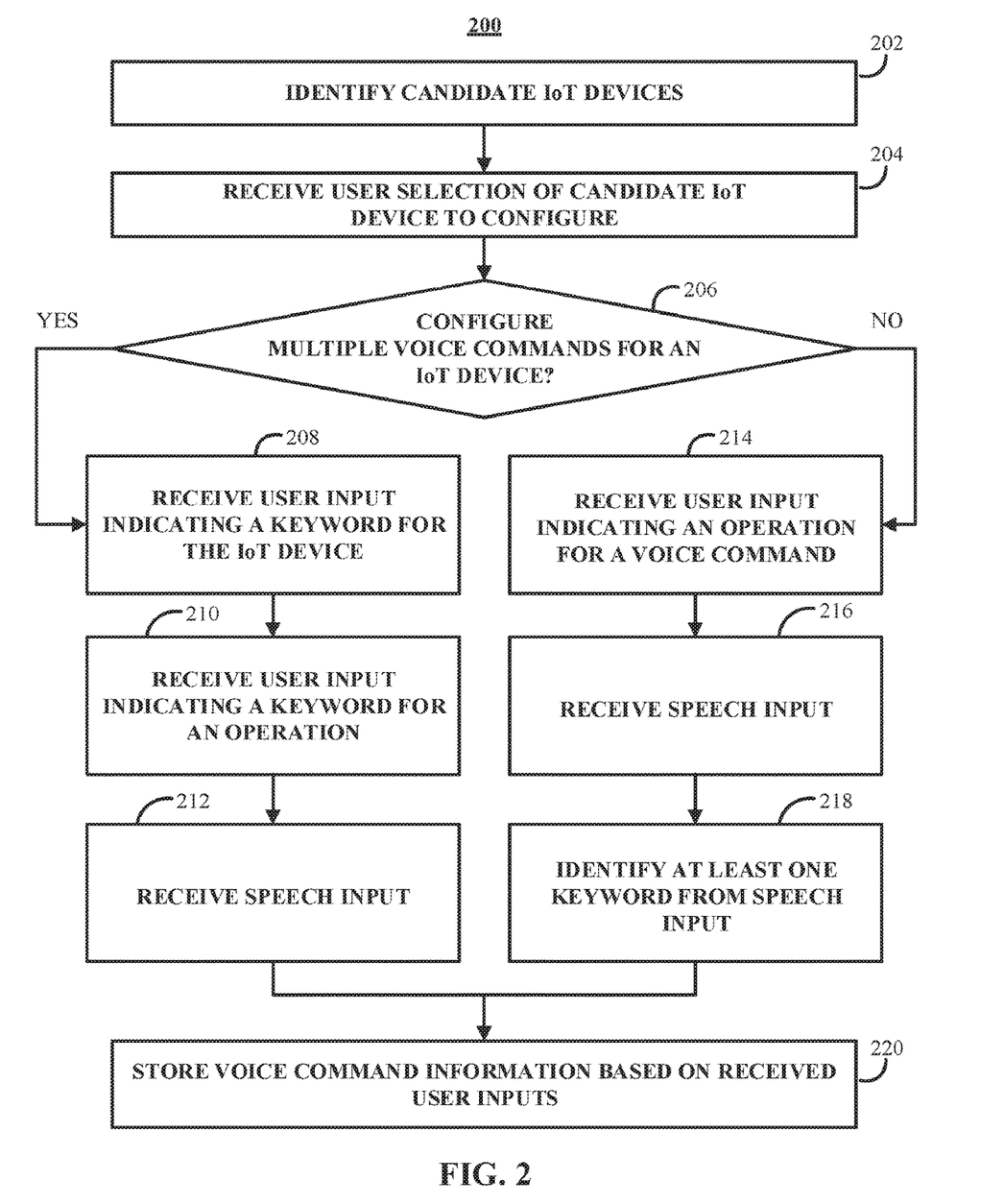
FIG. 2 shows a flow diagram of an example of a process for configuring voice commands in accordance with some embodiments of the disclosed subject matter.

FIG. 2 shows a flow diagram of an example 200 of a process for configuring voice commands in accordance with some embodiments of the disclosed subject matter.

At 202, process 200 can identify one or more candidate IoT devices to configure for voice commands.

In some embodiments, a candidate IoT device can be any suitable IoT device. For example, a candidate IoT device can be an IoT device 416 as described below in connection with FIG. 4. Additionally or alternatively, in some embodiments, a candidate IoT device can be any device that is available to connect to an end-point device that is executing process 200.

In some embodiments, at 202, process 200 can identify a candidate IoT device using any suitable technique or combination of techniques. For example, process 200 can determine that a device is a candidate IoT device based on determining that the device is on the same local area network as an end-point device executing process 200. As another example, process 200 can determine that an IoT device is a candidate IoT device based on the IoT device having been used or having been configured for use in connection with a particular user account. As a more particular example, in a situation where process 200 is being used to configure voice commands for a user account of a telecommunications application (e.g., a VoIP calling application), process 200 can determine that an IoT device is a candidate based on a determination that the IoT device has been used to access the user account, and/or a determination that the IoT device has been configured to use the telecommunications application in connection with the user account.

In some embodiments, at 202, process 200 can determine that an IoT device is a candidate IoT device by initiating a wireless connection with the IoT device. For example, process 200 can initiate any suitable wireless connection with an IoT device, and in response to successfully establishing the wireless connection, determine that the IoT device is a candidate IoT device. As a more particular example, in response to successfully establishing a wireless connection, process 200 can determine that an IoT device is a candidate IoT device by determining the capabilities of the IoT device (e.g., determining that the end-point device can connect to a particular type of call).

In some embodiments, at 202, process 200 can identify one or more candidate IoT devices by receiving a user input identifying one or more candidate IoT devices.

At 204, process 200 can receive a user selection of one or more of the identified candidate IoT devices to configure for voice commands.

In some embodiments, at 204, process 200 can receive a user selection using any suitable technique or combination of techniques. For example, process 200 can receive a voice-based user selection. As a more particular example, in a situation in which keywords have already been configured with respect to one or more of the identified candidate IoT devices, process 200 can receive a user selection of one or more of the identified candidate IoT devices by detecting a user speaking a corresponding keyword. As another example, process 200 can receive a user selection by causing a user interface to be presented and by receiving a selection of a user interface element corresponding to one or more of the identified candidate IoT devices.

At 206, process 200 can determine whether to configure multiple voice operations for a selected IoT device or devices.

In some embodiments, at 206, process 200 can determine whether to configure multiple voice operations for selected IoT device(s) by receiving any suitable user input indicating whether to configure multiple voice operations. For example, process 200 can receive any suitable user input described above in connection with 204.

If, at 206, process 200 determines to configure multiple voice commands for an IoT device, then at 208, process 200 can receive user input indicating a keyword to become associated with the IoT device.

In some embodiments, at 208, process 200 can receive user input using any suitable technique or combination of techniques. For example, process 200 can receive user input by causing a user interface to be presented that is configured to allow the user to input a keyword (e.g., by typing the keyword, or selecting one of a plurality of presented keywords). As another example, process 200 can prompt a user to speak a keyword and receive audio data corresponding to a spoken keyword. In such an example, process 200 can utilize any suitable speech detection technique to parse the keyword from the received audio data.

At 210, process 200 can receive user input indicating a keyword for an operation.

In some embodiments, at 210, process 200 can receive user input using any suitable technique or combination of techniques. For example, process 200 can receive user input as described above in connection with 208.

In some embodiments, at 210, in connection with receiving user input indicating a keyword, process 200 can further receive user input indicating an operation to be associated with an indicated keyword. For example, process 200 can cause a user interface to be presented that includes a plurality of selectable operations to become associated with an indicated keyword, and receive an indication of one of the selectable options. As another example, in a situation in which keywords have already been configured with respect to one or more operations, process 200 can receive a user selection of an operation by detecting a user speaking a keyword corresponding to the operation. In some embodiments, an indicated operation can be any suitable operation, such as an operating for transmitting IoT device information, an operation for causing an IoT device to transmit IoT device information, and/or an operation for adding an IoT device to a call.

At 212, process 200 can receive speech input and associate the speech input with a keyword indicated at 208 and/or 210.

In some embodiments, the speech input can be any suitable speech input. For example, the speech input can be audio data as described above in connection with FIG. 1.

In some embodiments, at 212, process 200 can create any suitable association between speech input and a keyword indicated at 208 and/or 210. For example, process 200 can associate speech input and a keyword such that the keyword should be recognized as a voice command when similar speech input is later received.

Additionally or alternatively, in some embodiments, at 212, process 200 can associate received speech input with a user that provided the speech input such that, in a situation in which a different user is speaking a keyword indicated at 208 and/or 210, the mechanisms described herein would recognize that such a user is different from the user that provided the speech input, and not cause, or inhibit from causing, any operations associated with the keywords from being executed. For example, after associating the received speech input with the user that provided the speech input, the mechanisms described herein can utilize a voice recognition, speaker identification, or speaker verification technique as described above in connection with 106 of FIG. 1 to determine that the user is different from the user that provided the speech input.

If at 206, process 200 determines not to configure multiple voice commands for an IoT device, then at 214, process 200 can receive user input indicating an operation for a voice command.

In some embodiments, at 214, process 200 can receive user input using any suitable technique or combination of techniques. For example, process 200 can receive user input using a technique as described above in connection with 210.

At 216, process 200 can receive speech input and associate the speech input with an indicated operation.

In some embodiments, at 216, process 200 can receive speech input using any suitable technique or combination of techniques. For example, process 200 can receive speech input using a technique as described above in connection with 212.

In some embodiments, at 216, process 200 can create any suitable association between received speech input and an indicated operation. For example, process 200 can create an association as described above in connection with 212.

In some embodiments, at 216, process 200 can receive speech input subsequent to prompting a user to enter speech input. For example, process 200 can cause a message to be presented on a user interface that prompts a user to provide speech input. As another example, process 200 can cause an audio message to be presented that prompts a user to provide speech input.

In some embodiments, at 216, process 200 can prompt a user to enter speech input that corresponds to a predetermined keyword, keywords, and/or key phrase (e.g., as described above in connection with FIG. 1). For example, in a situation in which an operation being configured is an operation to add an IoT device (e.g., a television) to a call (e.g., as described above in connection with FIG. 1), process 200 can prompt a user to provide speech input corresponding to the phrase "add my television to this call," or any other suitable key phrase.

At 218, process 200 can identify at least one keyword or key phrase from speech input.

In some embodiments, at 218, process 200 can identify at least one keyword or key phrase using any suitable technique or combination of techniques. For example, process 200 can use any suitable speech recognition technique (e.g., a speech recognition technique as described above in connection with FIG. 1).

At 220, process 200 can store voice command information based on user inputs received at 208, 210, 212, 214, 216, and/or 218.

In some embodiments, the voice command information to be stored can include any suitable information that is based on user inputs. For example, voice command information can include indications of keywords received at 208, 210, 216, and/or 218. As another example, voice command information can include audio data and/or any other suitable data corresponding to and/or based on speech inputs received 208, 210, 212, 214, 216, and/or 218. As yet another example, the voice command information can include information identifying an operation indicated at 210 and/or 214.

In some embodiments, at 220, process 200 can store voice command information at any suitable location. For example, process 200 can store voice command information at a server device (e.g., a server device of a calling service, as described below in connection with FIG. 4). As another example, process 200 can store voice command information at an end-point device.

Figure 3:
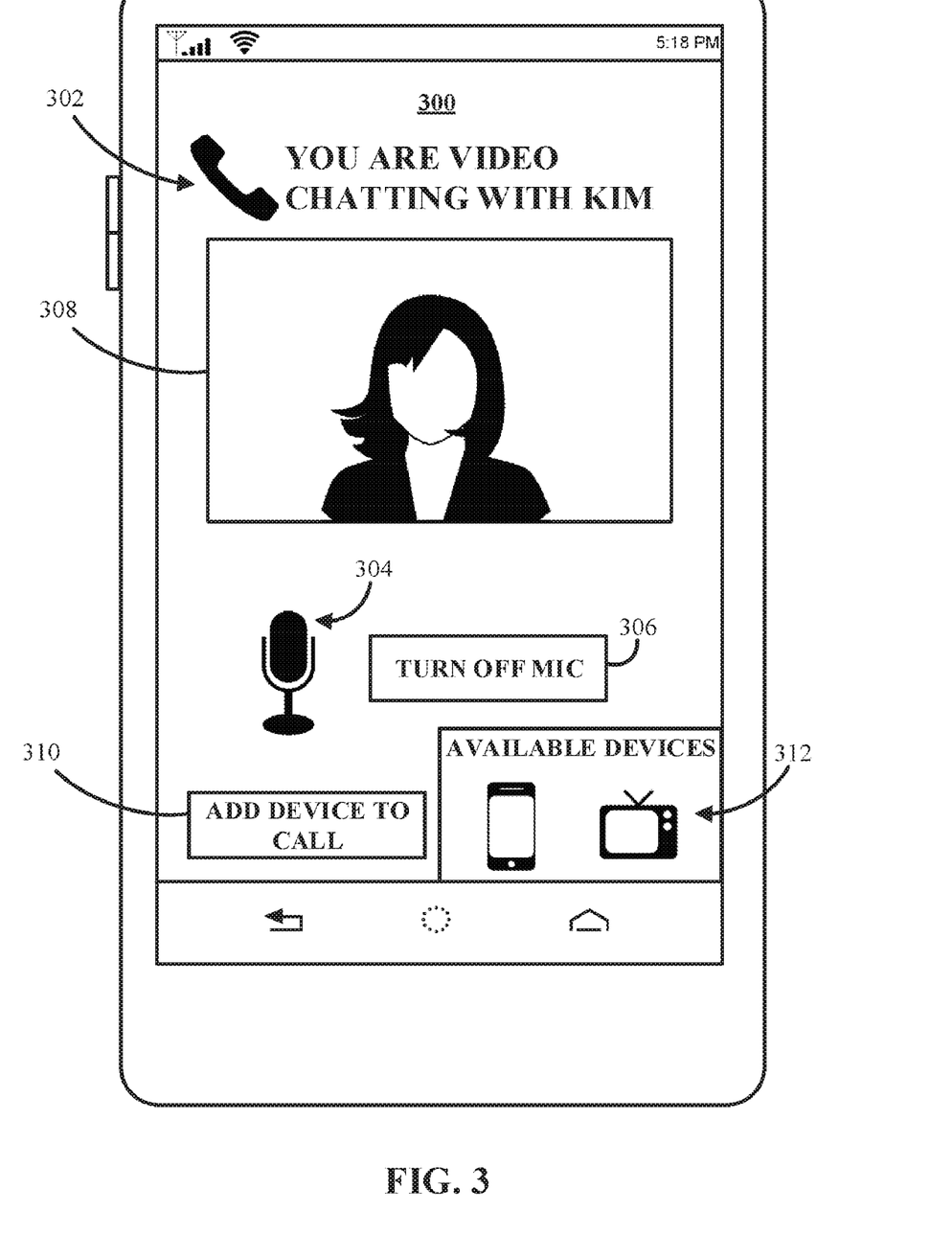
FIG. 3 shows an illustration of an example of a user interface for connecting an IoT device to a call in accordance with some embodiments of the disclosed subject matter.

FIG. 3 shows an illustration of an example 300 of a user interface for connecting an IoT device to a call in accordance with some embodiments of the disclosed subject matter.

In some embodiments, user interface 300 can include a call notification element 302, a microphone status element 304, a microphone input element 306, a video call window 308, a device connecting input element 310, and an available device notification element 312.

In some embodiments, call notification element 302 can be any element suitable for presenting a notification of a call. For example, call notification element 302 can be a message, an icon, an image, a video, an e-mail, a text message, a pop-up message, or any other element suitable for presenting a notification of a call. Additionally or alternatively, in some embodiments, call notification element 302 can be a tactile or audio notification element.

In some embodiments, microphone status element 304 can be any element suitable for presenting a status of a microphone. For example, microphone status element 304 can be a message, an icon, an image, a video, a pop-up message, or any other user interface element suitable for presenting the status of a microphone.

In some embodiments, microphone status element 304 can present any suitable microphone status, such as an on status, an off status, a volume status, a status indicating that call audio is being captured, a status indicating that process 100 is detecting voice commands, any other suitable status, or any suitable combination thereof.

In some embodiments, microphone input element 306 can be any input element suitable for receiving a user input for controlling a microphone. For example, microphone input element 306 can be a selectable icon, a button, a switch, a scale, a slider, any other suitable input element, or any suitable combination thereof.

In some embodiments, in response to being selected, microphone input element 306 can cause process 100 as described above in connection with FIG. 1, and/or cause process 200 as described as described above in connection with FIG. 2, to receive audio data and/or speech input via a microphone connected to a device that is presenting user interface 300.

In some embodiments, in response to being selected, microphone input element 306 can cause process 100 as described above in connection with FIG. 1 to capture audio data being transmitted over a call and/or detect voice commands.

In some embodiments, video call window 308 can be any element suitable for presenting any suitable video in connection with a call. For example, video call window 308 can be an element for presenting video of another user that is connected to the call, and/or for presenting video that is being shared via the call.

In some embodiments, device connecting input element 310 can be any input element suitable for causing a device to be connected to a call. For example, device connecting input element 310 can be a selectable icon, a button, a switch, a scale, a slider, any other suitable input element, or any suitable combination thereof.

In some embodiments, in response to being selected, device connecting input element 310 can cause an IoT device to be added to a call using any suitable technique or combination of techniques. For example, device connecting input element 310 can cause a device to be added to a call using an operation as described above in connection with FIG. 1. In some embodiments, in response to being selected, device connecting input element 310 can cause one or more selectable options to be presented that each correspond to an available IoT device.

In some embodiments, in addition or in alternative to adding a device to a call, in response to being selected, device connecting input element 310 can cause IoT device information to be transmitted to a third party (e.g., using an operation as described above in connection with FIG. 1).

In some embodiments, available device notification element 312 can be any element suitable for presenting a notification of IoT devices that are available for connection. For example, available device notification element 312 can be a message, an icon, an image, a video, an e-mail, a text message, a pop-up message, or any other element suitable for presenting a notification of available devices.

In some embodiments, available device notification element 312 can include one or more selectable elements that each correspond to an available IoT device, and in response to being selected, can cause a corresponding IoT device to be connected to a call.

In some embodiments, available device notification element 312 can present a notification corresponding to each candidate IoT device determined at 202 of FIG. 2.

Figure 4:
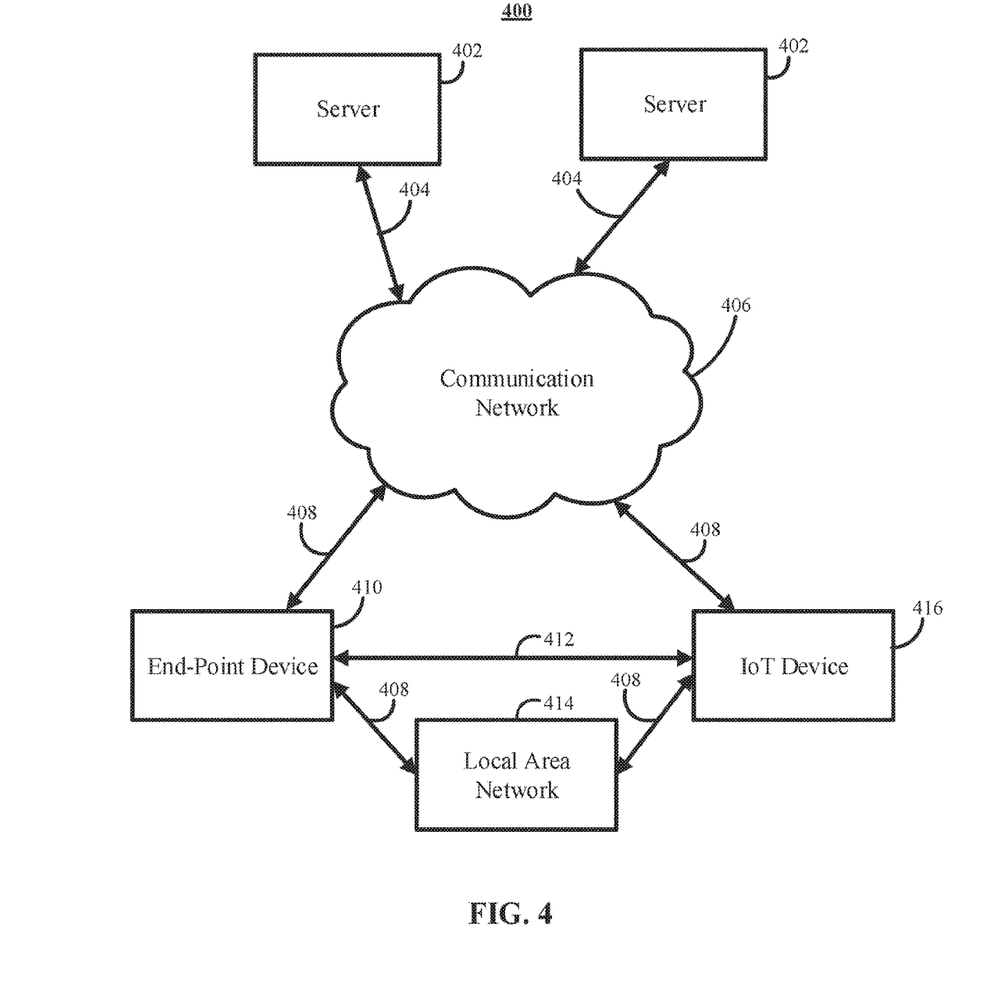
FIG. 4 shows a block diagram of an example of a system suitable for implementation of the mechanisms described herein for connecting an IoT device to a call in accordance with some embodiments of the disclosed subject matter.

FIG. 4 shows a block diagram of an example 400 of a system suitable for implementation of the mechanisms described herein for connecting an IoT device to a call in accordance with some embodiments of the disclosed subject matter. As illustrated, system 400 can include two server devices 402, a communication network 406, an end-point device 410, a local area network 414, and an IoT device 416.

In some embodiments, server devices 402 can be any server devices suitable for implementing some or all of the mechanisms described herein for connecting a device to a call. For example, each server device 402 can be a server device that executes one or more portions of process 100 as described above in connection with FIG. 1 and/or one or more portions of process 200 as described above in connection with FIG. 2. In some embodiments, one or more server devices 402 can connect with one or more end-point devices 410 via communication network 406 for a call (e.g., a video call, a VoIP call, and/or any other suitable call), and/or to transmit invitations to join a call. In some embodiments, one or more server devices 402 can connect to one or more IoT devices 416 via communication network 406 in order to transmit and/or receive IoT device information, and/or to connect an IoT device 416 to a call. In some embodiments, one or more of server devices 402 can be associated with a calling service (e.g., a video calling service or a VoIP calling service). Additionally or alternatively, in some embodiments, one or more of server devices 402 can store user account information associated with a calling service. In some embodiments, one or more server devices 402 can store any suitable voice command information.

Communication network 406 can be any suitable combination of one or more wired and/or wireless networks in some embodiments. For example, communication network 406 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network.

End-point device 410 and/or IoT device 416 can be connected by one or more communications links 408 to communication network 406 which can be linked via one or more communications links 404 to server devices 402. Communications links 404 and/or 408 can be any communications links suitable for communicating data among end-point devices 410 and server devices 402, such as network links, dial-up links, wireless links, hard-wired links, any other suitable communications links, or any suitable combination of such links.

Local area network 414 can be any suitable local area network in some embodiments. For example, local area network 414 can be a Wi-Fi network, an Ethernet network, a home area network, an intranet network, or any other suitable local area network.

End-point device 410 can be implemented as any user device suitable for receiving and/or connecting to phone calls, video calls, VoIP calls, any other suitable calls, or any suitable combination thereof. Additionally, end-point device 410 can be implemented as any user device suitable for presenting user interfaces, receiving user inputs and/or speech inputs as described above in connection with FIG. 1, FIG. 2, and FIG. 3, and/or any other suitable functions. For example, in some embodiments, end-point device 410 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, end-point devices 410 can be implemented as a non-mobile device such as a desktop computer, a set-top box, a television, a streaming media player, a game console, and/or any other suitable non-mobile device.

IoT device 416 can be implemented as any device suitable connecting to other devices and/or connecting to phone calls, video calls, VoIP calls, any other suitable calls, or any suitable combination thereof. For example, IoT device 416 can be implemented as any device with wireless connection capabilities, such as BLUETOOTH, Wi-Fi, near-field communication, any other suitable wireless connection capability, or any suitable combination thereof. In some embodiments, IoT device 416 can be implemented as any suitable device and/or appliance, such as an oven, a thermostat, a smart lock, a refrigerator, coffee machine, any suitable cooking device (e.g., microwave, slow cooking device, and/or pressure cooking device), a tablet device, a speaker device, a personal assistant device, a telephone, a television, a stereo device, media device, security system, alarm system (e.g., fire alarm, smore alarm, and/or intruder alarm), light fixture, light switch, light bulb, flood sensor, water valve, door sensor, window sensor, home automation hub, smart switch, air quality sensor, virtual reality device, doorbell, camera, Internet router, modem, programmable IoT button, watch, clock, fitness tracking device, climate control device (e.g., a heater, ventilator, air conditioner, and/or dehumidifier), health monitor device, pet monitor device, water heater, garage door control device, and/or any other suitable device. In some embodiments, IoT device 416 can be implemented as an end-point device 410.

In some embodiments, end-point device 410 and IoT device 416 can be connected via communications link 412, and/or via communications link 408 and local area network 414. Communications links 412 and 408 can be any suitable communications links, such as a wired communications links (e.g., via Ethernet, Universal Serial Bus, or any other suitable wired communications link), near-field communications links, BLUETOOTH communications links, Wi-Fi communications links, or any other suitable communications links.

Although two server devices 402 are shown in FIG. 4 to avoid over-complicating the figure, the mechanisms described herein for connecting an IoT device to a call can be performed using any suitable number of server devices (including none) in some embodiments. For example, in some embodiments, the mechanisms can be performed by a single server device 402 or multiple server devices 402.

Although one end-point device 410 and one IoT device 416 are shown in FIG. 4 to avoid over-complicating the figure, any suitable number of end-point devices and IoT devices, and/or any suitable types thereof, can be used in some embodiments.

Server devices 402, end-point device 410, and IoT device 416 can be implemented using any suitable hardware in some embodiments. For example, server devices 402, end-point device 410, and IoT device 416 can be implemented using hardware as described below in connection with FIG. 5. As another example, in some embodiments, devices 402, 410, and 416 can be implemented using any suitable general purpose computer or special purpose computer. Any such general purpose computer or special purpose computer can include any suitable hardware.

Figure 5:
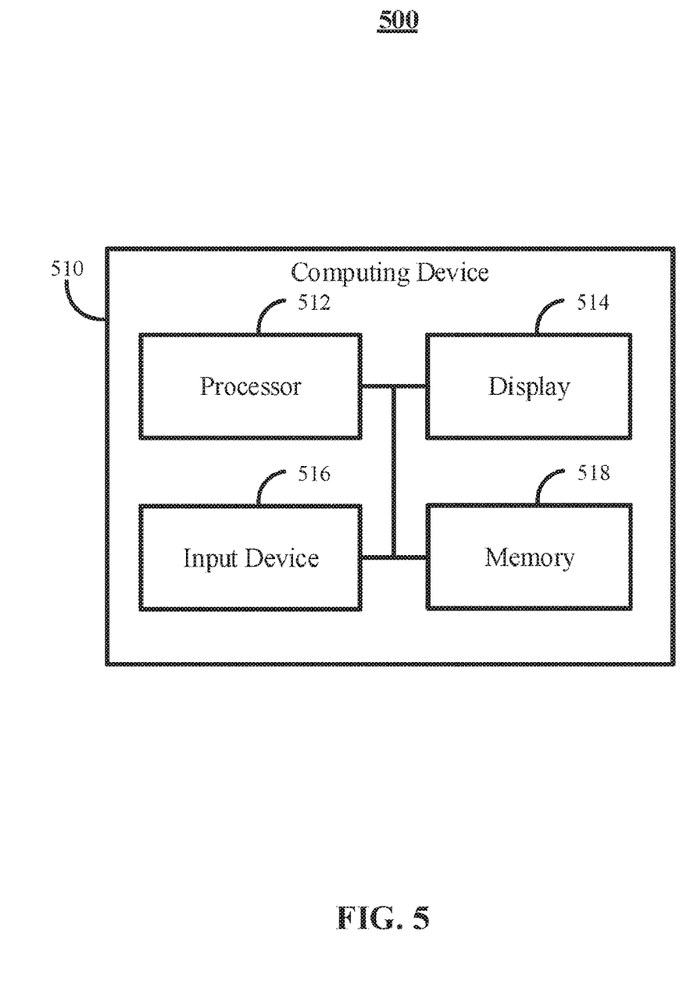
FIG. 5 shows a block diagram of an example of hardware that can be used in accordance with some embodiments of the disclosed subject matter for connecting an IoT device to a call.

FIG. 5 shows a block diagram of an example 500 of hardware that can be used in accordance with some embodiments of the disclosed subject matter.

Hardware processor 512 can execute the processes described herein for configuring voice commands (e.g., as described above in connection with FIG. 2), connecting an IoT device to a call (e.g., as described above in connection with FIG. 1), and/or performing any other suitable functions in accordance with the mechanisms described herein (e.g., as described above in connection with FIG. 1, FIG. 2, FIG. 3, and/or FIG. 4). In some embodiments, hardware processor 512 can send and receive data through communications links 404, 408, 412, 416, or any other communication links using, for example, a transmitter, a receiver, a transmitter/receiver, a transceiver, or any other suitable communication device. In some embodiments, memory and/or storage 518 can include a storage device for storing data received through communications link 404, 408, 412, 416, or any other communication links. The storage device can further include a program for controlling hardware processor 512. In some embodiments, memory and/or storage 518 can store voice command information (e.g., as described above in connection with 108 of FIG. 1 and 220 of FIG. 2). Display 514 can include a touchscreen, a flat panel display, a cathode ray tube display, a projector, a speaker or speakers, and/or any other suitable display and/or presentation devices. Input device 516 can be a computer keyboard, a computer mouse, a touchpad, a voice recognition circuit, a touchscreen, a microphone, and/or any other suitable input device.

Any other suitable components can be additionally or alternatively included in hardware 500 in accordance with some embodiments.

In some embodiments, at least some of the above described blocks of the processes of FIG. 1 and FIG. 2 can be executed or performed in any order or sequence not limited to the order and sequence shown in and described in connection with the figures. Also, some of the above blocks of FIG. 1 and FIG. 2 can be executed or performed substantially simultaneously where appropriate or in parallel to reduce latency and processing times. Additionally or alternatively, in some embodiments, some of the above described blocks or components of the processes and/or systems of FIG. 1, FIG. 2, FIG. 3, FIG. 4, and/or FIG. 5 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media. Accordingly, methods, systems, and media for connecting an IoT device to a call are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method comprising:
  establishing, at a first device, a communication channel with a second device;
  detecting, using the first device, a voice command;
  determining whether terms in the voice command identify an IoT device and an operation to be performed by the IoT device and determining whether the voice command corresponds to a command to add the IoT device to the communication channel between the first device and the second device that a user of the first device is currently engaged in; and
  in response to determining that the terms in the voice command identify the IoT device and the operation to be performed by the IoT device and determining that the voice command corresponds to the command to add the IoT device to the communication channel between the first device and the second device that the user of the first device is currently engaged in, causing the IoT device to join the communication channel, wherein device information associated with the IoT device is transmitted to the second device.

2. The method of claim 1, further comprising determining that the first device and the IoT device are connected to a particular local area network.

3. The method of claim 1, wherein the device information associated with the IoT device is transmitted by the IoT device to the second device using the communication channel.

4. The method of claim 1, wherein the second device is associated with a user account, and wherein the device information associated with the IoT device is transmitted to the user account.

5. The method of claim 1, wherein the device information associated with the IoT device comprises status information related to a status of the IoT device.

6. The method of claim 1, wherein the device information associated with the IoT device comprises information that can be used to initiate a connection with the IoT device, and wherein the method further comprises:
  causing, using a connection initiated by the second device, status information related to a status of the IoT device to be transmitted by the IoT device to the second device.

7. The method of claim 1, wherein the voice command is detected subsequent to establishing the communication channel and prior to a termination of the communication channel.

8. The method of claim 1, further comprising:
  determining that the IoT device is available for wireless communication;
  receiving an indication of the terms; and
  determining that the terms are to be associated with the IoT device based on the indication of the terms.

9. The method of claim 8, wherein the indication of the terms is based on a user input.

10. The method of claim 8, wherein the indication of the terms is received from a server device that is associated with a user account with which the IoT device is associated.

11. A system comprising:
  a hardware processor that is configured to:
    establish, at a first device, a communication channel with a second device;
    detect, using the first device, a voice command;
    determine whether terms in the voice command identify an IoT device and an operation to be performed by the IoT device and determining whether the voice command corresponds to a command to add the IoT device to the communication channel between the first device and the second device that a user of the first device is currently engaged in; and
    in response to determining that the terms in the voice command identify the IoT device and the operation to be performed by the IoT device and determining that the voice command corresponds to the command to add the IoT device to the communication channel between the first device and the second device that the user of the first device is currently engaged in, cause the IoT device to join the communication channel, wherein device information associated with the IoT device is transmitted to the second device.

12. The system of claim 11, wherein the hardware processor is further configured to determine that the first device and the IoT device are connected to a particular local area network.

13. The system of claim 11, wherein the device information associated with the IoT device is transmitted by the IoT device to the second device using the communication channel.

14. The system of claim 11, wherein the second device is associated with a user account, and wherein the device information associated with the IoT device is transmitted to the user account.

15. The system of claim 11, wherein the device information associated with the IoT device comprises status information related to a status of the IoT device.

16. The system of claim 11, wherein the device information associated with the IoT device comprises information that can be used to initiate a connection with the IoT device, and wherein the hardware processor is further configured to:
cause, using a connection initiated by the second device, status information related to a status of the IoT device to be transmitted by the IoT device to the second device.

17. The system of claim 11, wherein the voice command is detected subsequent to establishing the communication channel and prior to a termination of the communication channel.

18. A non-transitory computer-readable medium containing computer-executable instructions that, when executed by a processor, cause the processor to perform a method, the method comprising:

establishing, at a first device, a communication channel with a second device;
detecting, using the first device, a voice command;
determining whether terms in the voice command identify an IoT device and an operation to be performed by the IoT device and determining whether the voice command corresponds to a command to add the IoT device to the communication channel between the first device and the second device that a user of the first device is currently engaged in; and
in response to determining that the terms in the voice command identify the IoT device and the operation to be performed by the IoT device and determining that the voice command corresponds to the command to add the IoT device to the communication channel between the first device and the second device that the user of the first device is currently engaged in, causing the IoT device to join the communication channel, wherein device information associated with the IoT device is transmitted to the second device.

19. The system of claim 11, wherein the hardware processor is further configured to:
determine that the IoT device is available for wireless communication;
receive an indication of the terms; and
determine that a keyword is to be associated with the IoT device based on the indication of the terms.

20. The system of claim 19, wherein the indication of the terms is based on a user input.

21. The system of claim 19, wherein the indication of the terms is received from a server device that is associated with a user account with which the IoT device is associated.

* * * * *